United States Patent [19]
Krithivas et al.

[11] Patent Number: 6,014,511
[45] Date of Patent: Jan. 11, 2000

[54] O/S ABSTRACTION ARCHITECTURE FOR HID PC APPLICATIONS

[75] Inventors: Ramamurthy Krithivas, Chandler, Ariz.; Steven McGowan, Portland, Oreg.; Sharma Upadhyayula, Chandler, Ariz.

[73] Assignee: Intel Corporation, Santa Clara, Calif.

[21] Appl. No.: 08/921,408

[22] Filed: Aug. 29, 1997

[51] Int. Cl.⁷ ................................................... G06F 9/455
[52] U.S. Cl. ........................................................ 395/500.47
[58] Field of Search ................................. 395/500, 589, 395/685, 652, 739, 564, 500.44, 500.47, 500.48

[56] References Cited

U.S. PATENT DOCUMENTS

| | | |
|---|---|---|
| 5,241,634 | 8/1993 | Suzuki ................................ 395/589 |
| 5,375,241 | 12/1994 | Walsh ................................ 395/685 |
| 5,452,454 | 9/1995 | Basu ................................... 395/652 |
| 5,862,389 | 1/1999 | Kardach et al. .................... 395/739 |

Primary Examiner—Kevin J. Teska
Assistant Examiner—Dan Fiul
Attorney, Agent, or Firm—Blakely, Sokoloff, Taylor & Zafman LLP

[57] ABSTRACT

A method and system of transparently supporting functionalities on different versions of an operating system (O/S). An application is provided that determines if an O/S executing on a processor provides an O/S service layer. If the O/S service layer is provided, the application loads the O/S service layer. If no O/S service layer is provided, the O/S loads an alternative service layer which emulates a subset of the service provided by the O/S service layer. Regardless of the service layer loaded, the application follows the same flow path after the service layer is loaded.

14 Claims, 5 Drawing Sheets

O/S ABSTRACTION ARCHITECTURE FOR HID PC APPLICATIONS

BACKGROUND OF THE INVENTION

(1) Field of the Invention

The invention relates to a software architecture. More specifically, the invention relates to a software architecture which transparently provides compatibility with existing and future versions of an operating system.

(2) Related Art

In a typical system development cycle, a standard or specification for implementing a hardware innovation is established by one of the organizations such as IEEE to establish compatibility across the industry. Once the specification is established, there is a significant lag time before operating system producers release a new version of the operating system (O/S) providing support for the specified hardware innovation. During this lag time, the O/S vendor typically designs and documents an application programming interface (API) for the forthcoming O/S. The API is released to software vendors to give them a head start on programming compatible software. The API documentation sheds little or no light on the implementation of supported functions, but does let the software vendors know the expected types of inputs and outputs. Even after the API is released, many months of testing are still required to insure that all aspects of the operating system will function properly.

As a result of the substantial lag time and the cost of carrying inventory and/or upgrading systems employing a "quick fix," the manufacturer of components that contain the new hardware innovation tends to time the release of products containing that innovation with the release of the operating system supporting it. The net result is there is a long lag between the innovation and its availability to consumers.

While it is possible to develop an application and suitable API for the existing operating system in which the application provides the support for a particular hardware innovation, a new application is then required when the operating system upgrade is released. This also requires design and documentation of two APIs, one for the existing operating system and one for the future release. Since upgrading is never cost free, hardware vendors are hesitant to erode their margin by following this approach. Accordingly, this solution is not satisfactory.

Current examples of this lag to market include many Universal Serial Bus (USB) supported features. The USB is defined in the Universal Serial Bus Specification Version 1.0 (USB Spec). The USB Spec is generally supported in the current commercial release of the Windows operating system from Microsoft Corporation, code named Detroit. However, the USB enables many functions including, for example, control of the parameters for human interface devices (HIDs) from the host computer. To that end, the HID specification Version 1.0 (HID Spec) has been promulgated to standardize this host-based control of HIDs. Detroit does not support the HID Spec. Monitors are one important class of HID which are of particular interest to control from the host. Accordingly, the Monitor Class Specification Version 1.0 (Monitor Spec) has also been promulgated. Detroit also fails to provide support for the Monitor Spec.

The next generation of operating system from Microsoft, code named Memphis, will provide the support for both the HID Spec and the Monitor Spec. Unfortunately, it will be several months or longer before Memphis is widely available. While some software vendors have produced applications to support the HID Spec and Monitor Spec in conjunction with Detroit, hardware vendors are reluctant to support the protocols implemented in these applications which will necessitate the hardware vendors upgrading in response to the Memphis release. As noted above, such upgrades are never free and tend to significantly erode the margins of hardware vendors. As a result, monitors supporting the HID Spec and Monitor Spec are generally unavailable. Thus, consumers are denied access to a significant technological innovation while vendors await O/S support for the innovation.

In view of the foregoing, it would be desirable to be able to seamlessly and transparently provide support for various technological innovations in both an existing operating system and a future operating system, thereby speeding the availability of the innovation in the marketplace.

BRIEF SUMMARY OF THE INVENTION

A method and system of transparently supporting functionalities on different versions of an operating system (O/S) are disclosed. An application is provided that determines if an O/S executing on a processor provides an O/S service layer. If the O/S service layer is provided, the application loads the O/S service layer. If no O/S service layer is provided, the O/S loads an alternative service layer which emulates a subset of the service provided by the O/S service layer. Regardless of the service layer loaded, the application follows the same flow path after the service layer is loaded.

DETAILED DESCRIPTION OF THE INVENTION

Figure 1:
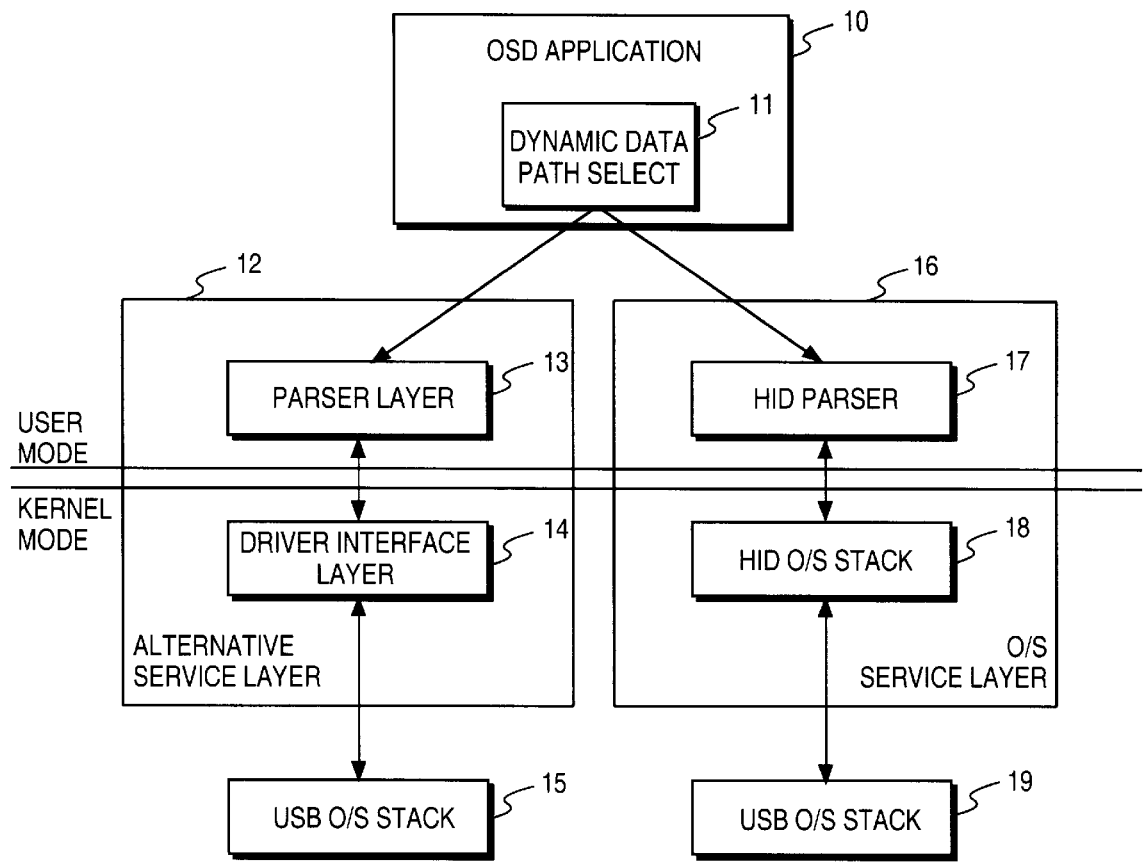
FIG. 1 is a block diagram of the software architecture of one embodiment of the invention.

FIG. 1 is a block diagram of the software architecture of one embodiment of the invention. An on-screen display (OSD) application 10 contains a dynamic data path selection mechanism 11 which selects between an O/S service layer 16 or an alternative service layer 12. In one embodiment of the invention, the dynamic data path selection is performed by the OSD application 10 identifying the O/S executing on the system. If the O/S is known to provide the O/S service layer 16, the O/S service layer 16 is selected by data path selection unit 11. If no O/S service layer 16 is present, an alternative service layer 12 is selected by dynamic data path selection mechanism 11. Significantly, until selected, the service layer need not be loaded into the system memory. Thus, if the O/S service layer 16 is provided, the alternative service layer 12 is not loaded and, therefore, does not occupy scarce system resources.

In one embodiment of the invention, the O/S service layer supports the HID Spec and the Monitor Spec. One of ordinary skill will understand that this exemplary embodiment is merely illustrative of a current use of the inverted architecture and is not intended to exclude support of future advances from the scope or coverage of the claims. This service layer is expected to be provided in the Microsoft operating system release code named Memphis. As is typically the case, Microsoft has promulgated an API which instructs application vendors as to the inputs and outputs expected by the service layer. It is expected that the service layer will contain an HID parser 17 and an HID O/S stack 18 which is effectively a transport layer between the HID parser 17 and the USB O/S stack 19. The USB O/S stack sends communications out along the USB wire. Details of the implementation of the O/S service layer 16 in Memphis are unknown.

The current version of the operating system from Microsoft code named Detroit provides only the USB O/S stack 15. Detroit provides no support for the HID Spec or the Monitor Spec. Thus, for OSD application 10 to be able to provide on-screen monitor control over the USB using Detroit, an alternative service layer 12 must be provided. Alternative service layer 12 includes a parser layer 13 and a driver interface layer 14 to satisfy the concerns of hardware vendors, and to make the OSD application 10 readily usable in both Memphis and Detroit, the alternative service layer is defined to accept a subset of the API calls accepted by the O/S service layer 16. In this way, the alternative service layer emulates the functionality of the O/S service layer for a subset of functions. Thus, since calls within the subset have identical format as between the O/S service layer 16 and the alternate service layer 12, the user need neither know nor care which service layer is loaded. The code flow path within the application beyond the loading point is identical in either case. In one embodiment, the particular subsets are those services required to support the portions of HID Spec and Monitor Spec used in controlling the operating parameter of a monitor.

Figure 2:
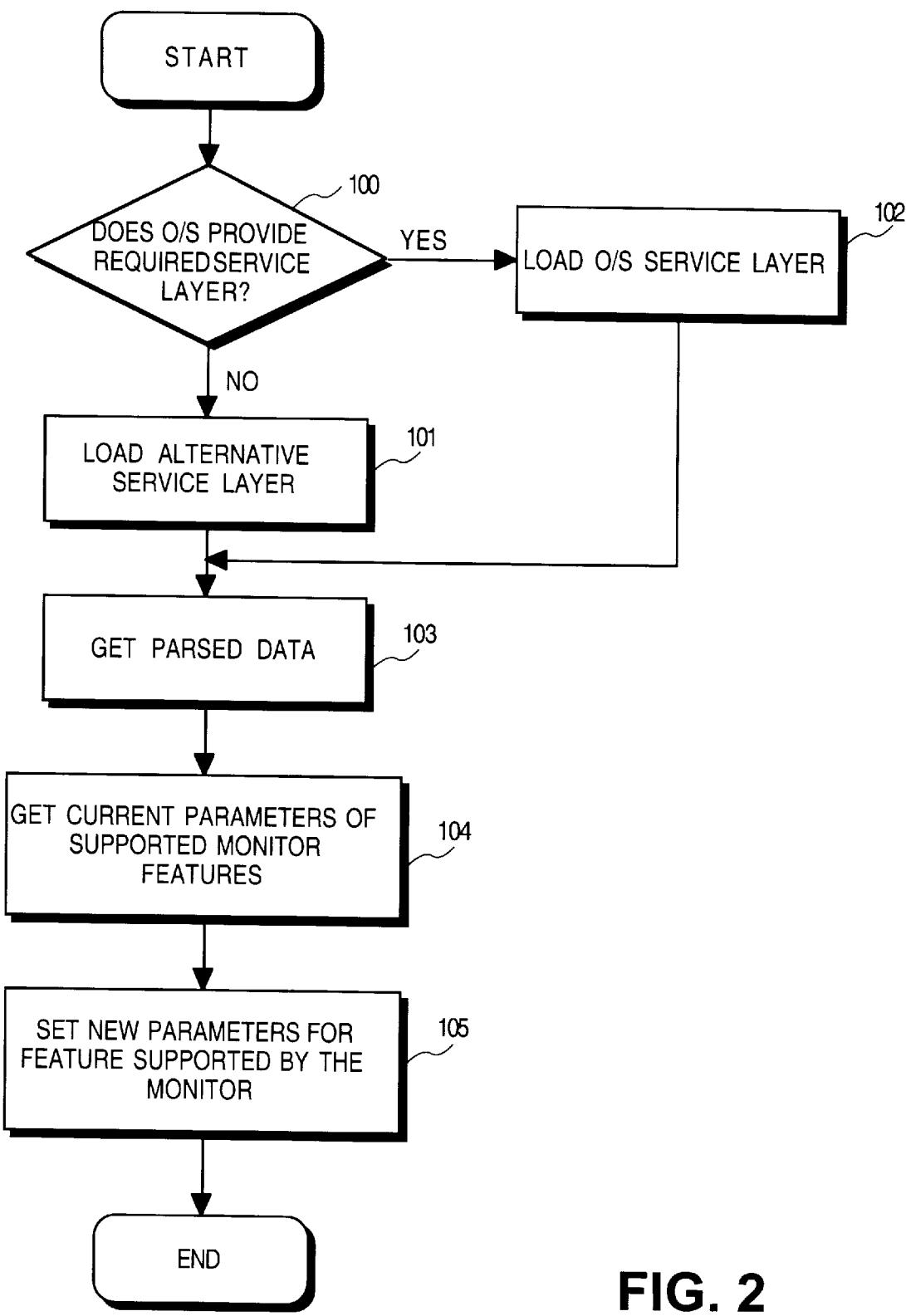
FIG. 2 is a flowchart of an OSD application of one embodiment of the invention.

FIG. 2 is a flowchart of an OSD application of one embodiment of the invention. At decision block 100, a determination is made whether the O/S provides a required O/S service layer. If it does, the O/S service layer is loaded at functional block 102. If it does not, the parser layer of the alternative service layer is loaded at functional block 101. The parser layer looks for a symbolic link to the driver interface layer of the alternative service layer. Once connection is established, the parser layer can receive and parse report descriptors as described in greater detail below. Once the service layer is loaded, the application gets the parsed data from the parser layer at functional block 103. The parsed data identifies to the application the features the monitor supports. Having identified the features the monitor supports, the OSD application can get the current parameters of the supported monitor features at functional block 104. And if desired, the application can set new parameters for the features supported at functional block 105. It is expected that the ability to adjust monitor parameters over the USB will permit monitor manufacturers to eliminate the hardware control knobs and buttons, thereby reducing unit manufacturing costs.

Figure 3:
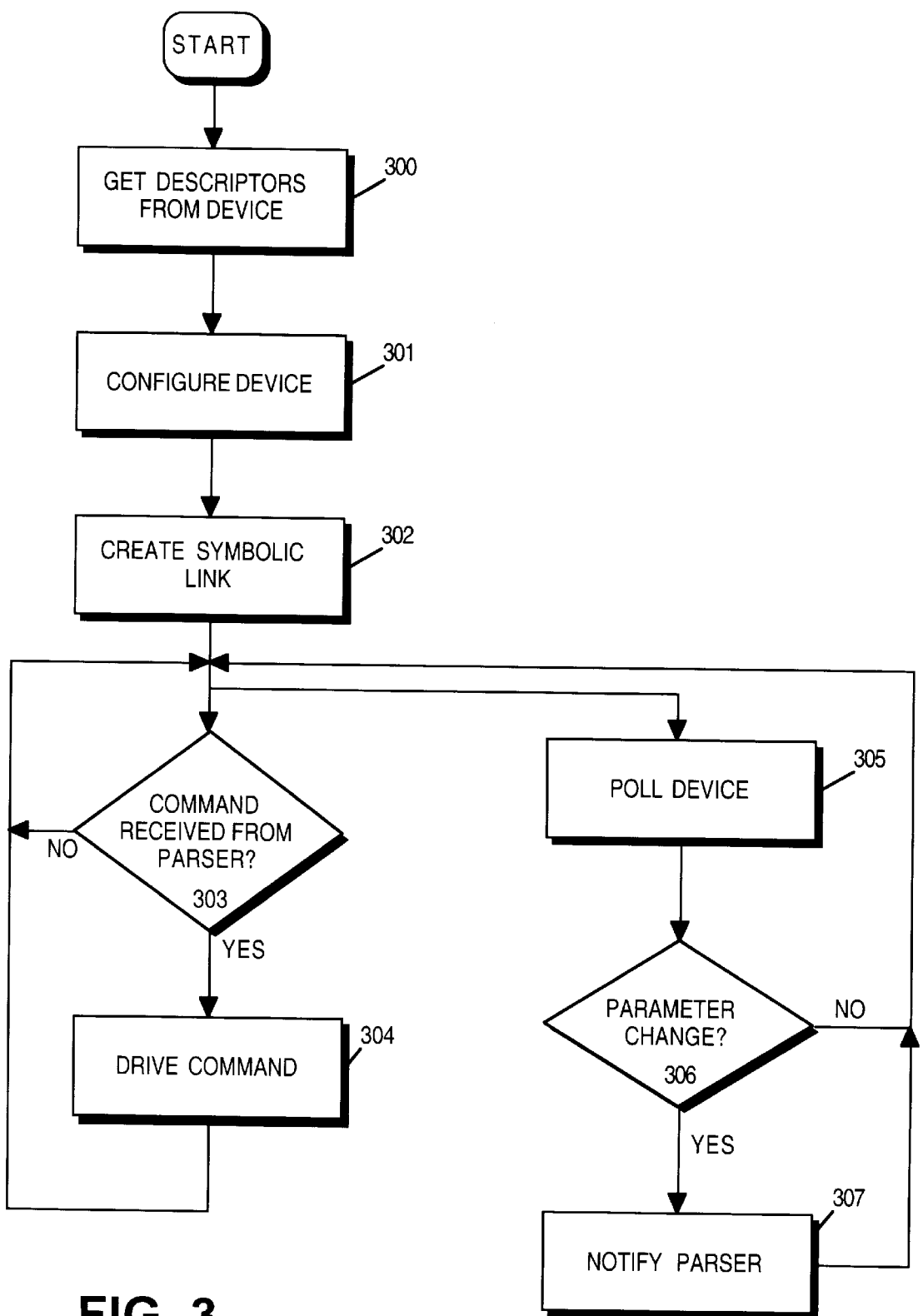
FIG. 3 is a flowchart of a driver layer of the alternative service layer in one embodiment of the invention.

FIG. 3 is a flowchart of a driver layer of the alternative service layer in one embodiment of the invention. The driver is loaded in response to a device being plugged in. In one embodiment, when a monitor is plugged in, the O/S checks a setup file that contains pointers to drivers and other setup information Based on those pointers, the O/S loads the appropriate driver interface layer.

Upon being loaded, the driver gets descriptors from a device to be driven at functional block 300. There are several descriptors, however, for our purposes, the most relevant of these is the report descriptor which is a block of data with a particular grammatical sequence to identify the features supported by a device. At functional block 301, the device is configured by the driver based on the descriptors obtained. At functional block 302, the driver then creates a symbolic link for which the parser layer will look once it is loaded by the application. If, at decision block 303, a command is received from the parser, the driver drives the command at functional block 304. Expected commands include "get" commands to get current parameters of features of the device and "set" commands to set new parameters for the features of the device.

Concurrently with checking for commands, the driver will periodically poll the device at functional block 305. This may take the form of an asynchronous read, the purpose of which is to identify if parameters of the device have been changed by an external agent. This may occur, for example, where a user adjusts brightness or contrast of a monitor using the hardware controls on the monitor itself. Thus, at decision block 306, a determination is made if a parameter change has occurred. If a parameter change has occurred, the driver notifies the parser at functional block 307 so the parser can notify the OSD application to adjust the OSD display to reflect the change. If there is no parameter change or after the parser has been notified, the driver returns to repeat the check for commands and polling.

Figure 4:
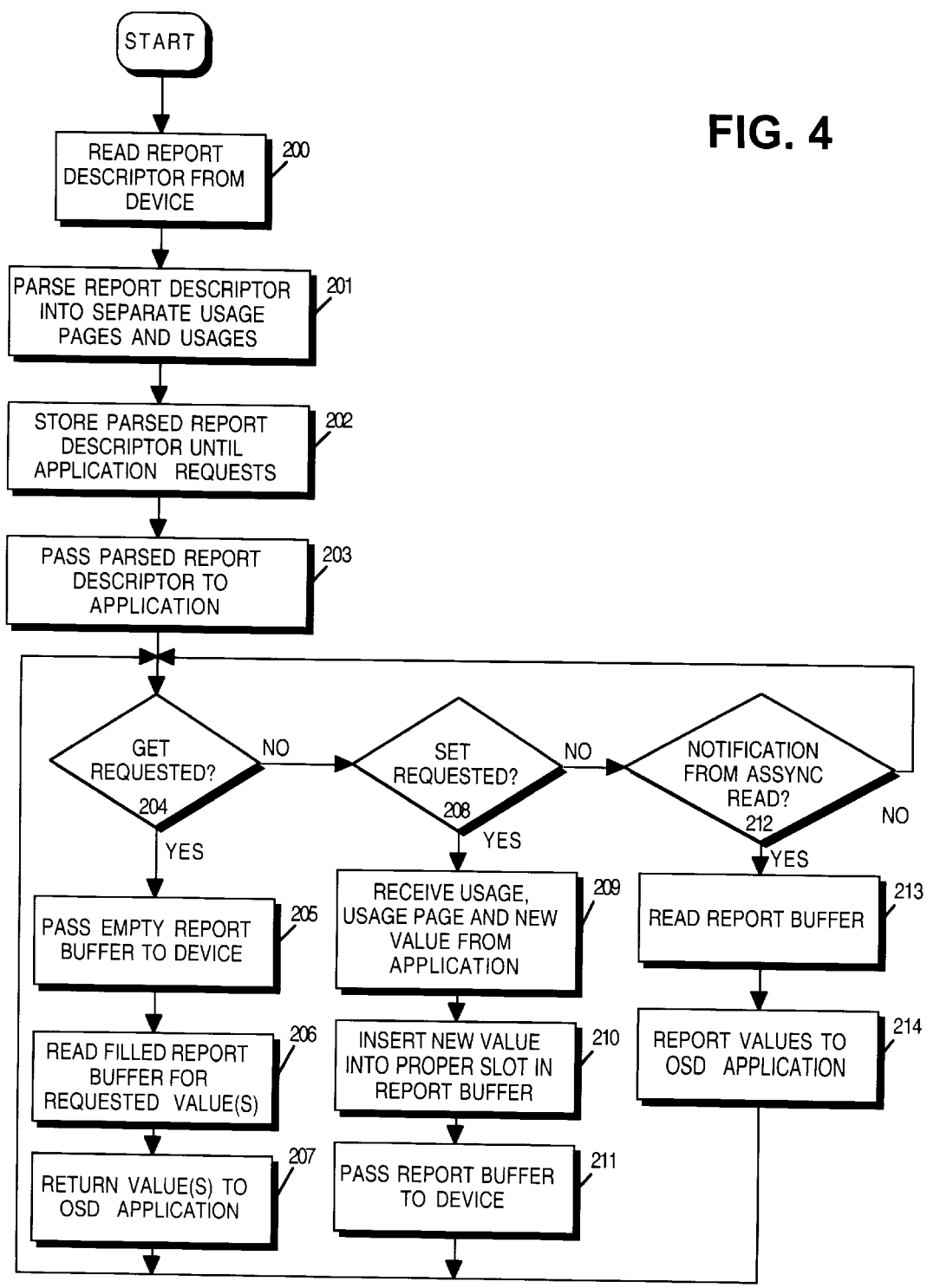
FIG. 4 is a flowchart of a parser layer of one embodiment of the invention.

FIG. 4 is a flowchart of a parser layer of one embodiment of the invention. Upon being loaded and requested by the application, the parser reads the report descriptor from the device at functional block 200. In reality, the parser sends the read of the device to the driver, and the driver returns the report descriptor to the parser layer. The parser then parses the report descriptor into separate usage pages and usages. In one embodiment of the invention, this is performed using a series of linked lists within linked lists. The usage page structure contains one or more report IDs. Each report ID block could contain an input queue, an output queue, or feature queue. A general structure of the usage page structure is based on the HID Spec. The parsed data is retained by the parser at functional block 202, and at functional block 203, the parsed report descriptor is passed to the OSD application.

At decision block 204, a determination is made if a "get" has been requested. As mentioned above, the application may request the parser to "get" current parameters. If a "get" has been requested, the parser passes an empty report buffer to the device at functional block 205. A report buffer is a portion of memory allocated to receive values corresponding to parameters of the device to be controlled. In one embodiment, a USB enabled monitor fills the report buffer with parameters of its features. At functional block 206, the parser reads the filled report buffer for the requested value or values. The value or values are then returned to the OSD application at functional block 207.

If no "get" is requested, a determination is made at decision block 208 if a set has been requested. If a set has been requested, the parser receives the usage and usage page and new value from the application at functional block 209. The new value is then inserted into a proper slot and a report buffer at functional block 210. The report buffer is then passed to the device at functional block 211.

If at decision block 208 no set is requested, a determination is made at decision block 212 if a notification has been received resulting from an asynchronous read. If a notification has been received, the parser reads the report buffer at functional block 213. The parser then reports the values from the report buffer to the OSD application at functional block 214.

Figure 5:
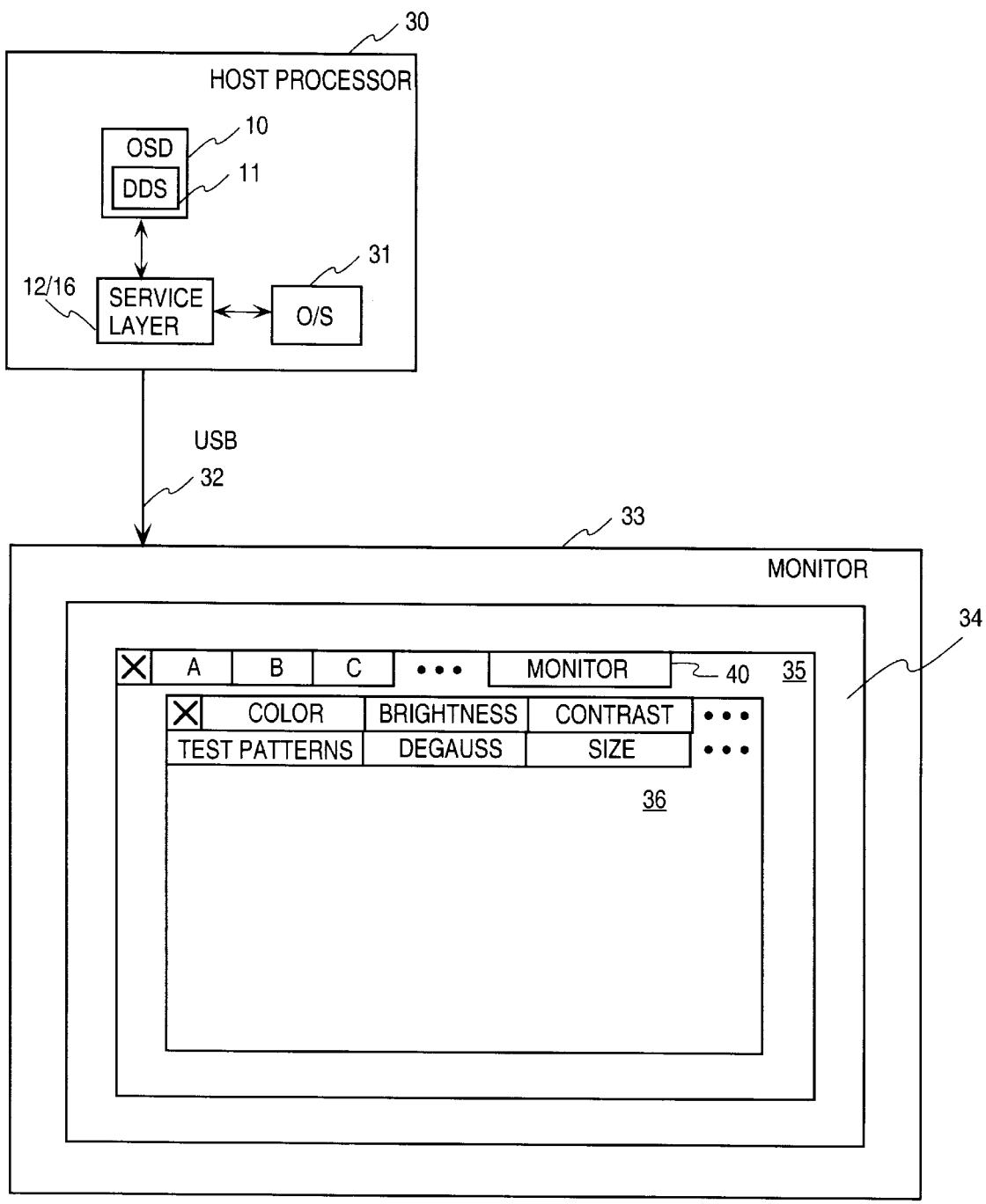
FIG. 5 is a block diagram of a system of one embodiment of the invention.

FIG. 5 is a block diagram of a system of one embodiment of the invention. A host processor 30 has an operating system 31 operating thereon. The host processor is connected to monitor 33 by Universal Serial Bus (USB) 32, and OSD application 10 employs dynamic data pass selection mechanism 11 to select an appropriate service layer corresponding to operating system 31. The OSD application 10 adds a monitor tab 40 to window 35 displayed on display 34 of monitor 33. Clicking on the monitor tab activates a second window 36 which displays tabs corresponding to features of the monitor. A wide variety of features may be supported including, but not limited to, color, brightness, contrast, test patterns, degaussing, and size changes. In one embodiment, only tabs corresponding to features possessed by monitor 33 will appear in the window 36. Clicking on the tab in window 36 may, for example, cause the display 34 to display a slider or other graphical user interface device which permits the user to adjust the parameter of the feature on screen. Because the host processor performs the processing necessary to provide the different features, a broader selection of features may be supported by the monitor at reduced cost.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:
   determining, in an application, if an operating system executing on a processor provides an operating system (O/S) service layer;
   loading the O/S service layer if provided;
   loading an alternative service layer which emulates a subset of the services of the O/S service layer if no O/S service layer is provided; and
   following a same flow path within the application regardless of whether the O/S service layer or the alternative service layer is loaded.

2. The method of claim 1 wherein the alternative service layer comprises a parser layer and a driver interface layer.

3. The method of claim 2 wherein the application is an on-screen display application.

4. The method of claim 3 wherein the alternative service layer supports human interface devices.

5. The method of claim 4 wherein the application provides a graphical user interface and on-line adjustment of monitor parameters.

6. The method of claim 1 wherein the method is transparent to a user.

7. The method of claim 1, the step of following the same flow path comprises the steps of:
   retrieving a set of current operating parameters of a device;
   accepting user changes to the set of parameters; and
   applying the set of parameters as changed to the device.

8. A system comprising:
   a host processor;
   a monitor supporting on-line parameter manipulation;
   a serial bus coupling the host processor with the monitor;
   an operating system (O/S) executing on the host processor; and
   an application executing on the host processor, the application containing a dynamic data path selection mechanism which loads one of an O/S service layer and an alternative service layer after transparently identifying the O/S;
   wherein the alternative service layer emulates a subset of service provided by the O/S service layer.

9. The system of claim 8 wherein the alternative service layer comprises a parser that receives a report descriptor of the monitor and parses the report descriptor to yield a set of usage pages and usages corresponding to the monitor.

10. The system of claim 8 further comprising:
    a report buffer for passing parameters between the service layer and the monitor.

11. The system of claim 8 wherein serial bus is a Universal Serial Bus.

12. The system of claim 8 wherein the application provides a graphical user interface which permits a user to adjust monitor parameters from an on-screen display.

13. The system of claim 12 wherein the selection and use of the O/S service or alternative service layer is transparent to the user.

14. A method comprising:
    providing an emulator of a subset of functions of a first operating system (O/S);
    dynamically identifying if a first O/S is presently executing on a host processor; and
    loading the emulator if and only if the first O/S is not presently executing on the host processor.

* * * * *